United States Patent
Yang et al.

(10) Patent No.: US 9,319,203 B2
(45) Date of Patent: Apr. 19, 2016

(54) METHOD OF TRANSMITTING CONTROL INFORMATION AND DEVICE FOR SAME

(75) Inventors: Suckchel Yang, Anyang-si (KR); Dongyoun Seo, Anyang-si (KR); Mingyu Kim, Anyang-si (KR); Hanbyul Seo, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 14/119,394

(22) PCT Filed: Jun. 15, 2012

(86) PCT No.: PCT/KR2012/004755
§ 371 (c)(1),
(2), (4) Date: Nov. 21, 2013

(87) PCT Pub. No.: WO2012/173433
PCT Pub. Date: Dec. 20, 2012

(65) Prior Publication Data
US 2014/0105191 A1    Apr. 17, 2014

Related U.S. Application Data

(60) Provisional application No. 61/508,068, filed on Jul. 15, 2011, provisional application No. 61/497,076, filed on Jun. 15, 2011.

(51) Int. Cl.
*H04L 5/00* (2006.01)
*H04L 1/18* (2006.01)
*H04W 4/00* (2009.01)

(52) U.S. Cl.
CPC ............ *H04L 5/0082* (2013.01); *H04L 1/1867* (2013.01); *H04W 4/005* (2013.01)

(58) Field of Classification Search
None
See application file for complete search history.

(56) References Cited

U.S. PATENT DOCUMENTS

| 2011/0032925 | A1 | 2/2011 | Lee et al. |
| 2011/0093756 | A1 | 4/2011 | Yang et al. |
| 2011/0107169 | A1 | 5/2011 | Löhr et al. |
| 2011/0116465 | A1* | 5/2011 | Miki et al. ............ 370/329 |
| 2011/0237231 | A1* | 9/2011 | Horneman et al. ........ 455/414.1 |
| 2012/0257559 | A1* | 10/2012 | Kim et al. ............ 370/311 |

FOREIGN PATENT DOCUMENTS

| KR | 10-2011-0030468 A | 3/2011 |
| WO | WO 2011/020922 A1 | 2/2011 |

* cited by examiner

*Primary Examiner* — Charles C Jiang
*Assistant Examiner* — George Atkins, Jr.
(74) *Attorney, Agent, or Firm* — Birch, Stewart, Kolasch & Birch, LLP

(57) ABSTRACT

The present invention relates to a wireless communication system. In more detail, a method for performing HARQ (hybrid automatic repeat request) retransmission by a communication device in a wireless communication system, the method comprising: initially transmitting a data block to a Base Station (BS); attempting PDCCH (physical downlink control channel detection) in a predetermined time interval including a plurality of subframes after transmission of an uplink channel signal; and retransmitting the data block when a PDCCH signal indicating retransmission of the data block is detected in the predetermined time interval, wherein reception of a PHICH (physical hybrid ARQ indicator channel) corresponding to initial transmission of the data block is skipped.

8 Claims, 13 Drawing Sheets

METHOD OF TRANSMITTING CONTROL INFORMATION AND DEVICE FOR SAME

CROSS REFERENCE TO RELATED APPLICATIONS

This application is the National Phase of PCT/KR2012/004755 filed on June 15, 2012, which claims priority under 35 U.S.C. 119(e) to U.S. Provisional Application Nos. 61/497,076 and 61/508/,068 filed on Jun 15, 2011 and Jul. 15, 2011 respectively, all of which are hereby expressly incorporated by reference into the present application.

TECHNICAL FIELD

The present invention relates to a wireless communication system and, more particularly, to a method for transmitting control information and a device therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method and device for efficiently transmitting control information in a wireless communication system. Another object of the present invention is to provide a method and device for suitably scheduling/feeding back for intermittent/a small quantity of data transmission. Another object of the present invention is to provide a method and device for efficiently scheduling/feeding back for MTC (Machine-Type-Communication).

The technical problems solved by the present invention are not limited to the above technical problems and those skilled in the art may understand other technical problems from the following description.

Technical Solution

The object of the present invention can be achieved by providing a method for performing HARQ (hybrid automatic repeat request) retransmission by a communication device in a wireless communication system, the method comprising: initially transmitting a data block to a Base Station (BS); attempting a detection of PDCCH (physical downlink control channel) in a predetermined time interval including a plurality of subframes after transmission of an uplink channel signal; and retransmitting the data block when a PDCCH signal indicating retransmission of the data block is detected in the predetermined time interval, wherein reception of a PHICH (physical hybrid ARQ indicator channel) corresponding to initial transmission of the data block is skipped.

In another aspect of the present invention, provided herein is a UE configured to perform HARQ (hybrid automatic repeat request) retransmission in a wireless communication system, comprising: a radio frequency (RF) unit; and a processor, wherein the processor is configured to initially transmit a data block to a Base Station (BS), to attempt a detection of PDCCH (physical downlink control channel) in a predetermined time interval including a plurality of subframes after transmission of an uplink channel signal and to retransmit the data block when a PDCCH signal indicating retransmission of the data block is detected in the predetermined time interval, wherein reception of a PHICH (physical hybrid ARQ indicator channel) corresponding to initial transmission of the data block is skipped.

Desirably, the initial transmission of the data block is performed through a PUSCH (physical uplink shared channel) allocated to SPS (semi-persistent scheduling).

Desirably, the predetermined time interval is periodically given according to an SPS transmission period, and PDCCH detection is skipped in subframes other than the predetermined time interval.

Desirably, the communication device includes an MTC (machine type communication) UE.

Advantageous Effects

According to the present invention, channel information can be efficiently transmitted in a wireless communication system. Specifically, during the intermittent/a small quantity of data transmission, scheduling/feeding back can be efficiently performed. And the scheduling/feeding back can be efficiently performed at MTC.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

In a wireless communication system, a UE (User Equipment) receives information from a BS (Base Station) through downlink (DL) and transmits information to the BS through uplink (UL). Information transmitted/received between the UE and BS includes data and various types of control information, and various physical channels are present according to type/purpose of information transmitted/received between the UE and BS.

Figure 1:
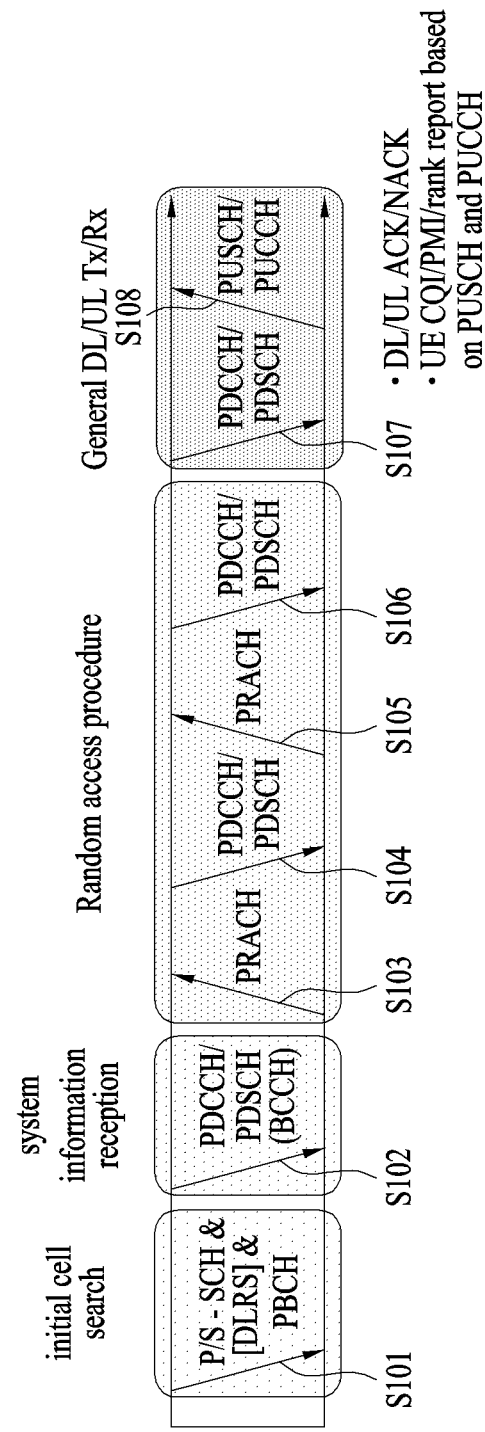
FIG. 1 illustrates physical channels used in a 3GPP LTE system and a signal transmission method using the same.

FIG. 1 illustrates physical channels used in a 3GPP LTE(-A) system and a signal transmission method using the same.

When powered on or when a UE initially enters a cell, the UE performs initial cell search involving synchronization with a BS in step S101. For initial cell search, the UE is synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). Meanwhile, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical. Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indicator (RI), etc. In the specification, HARQ ACK/NACK is simply referred to as HARQ-ACK or ACK/NACK(A/N). HARQ-ACK includes at least one of positive ACK (simply, ACK), negative ACK (NACK), DTX and NACK/DTX. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
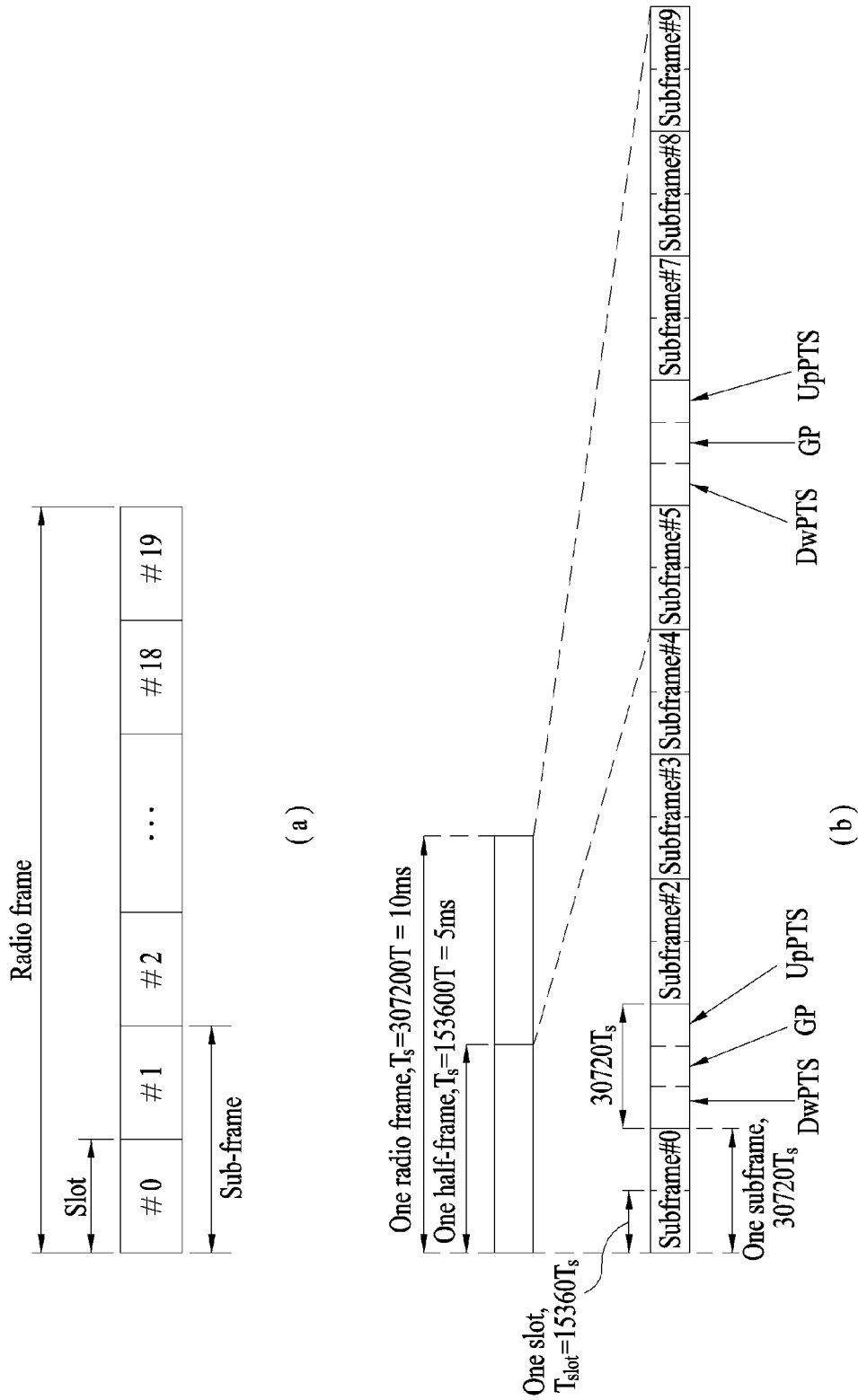
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE(-A) supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE(-A), an OFDM symbol represents a symbol period. The OFDM symbol may be called an SC-FDMA symbol or symbol period. An RB as a resource allocation unit may include a plurality of consecutive subcarriers in one slot.

FIG. 2(b) illustrates a type-2 radio frame structure. The type-2 radio frame includes 2 half frames. Each half frame includes 4 normal subframes and 1 special subframe. The special subframe configures a Downlink Pilot Time Slot (DwPTS), a Guard Period (GP), and an Uplink Pilot Time Slot (UpPTS). The DwPTS is used for initial cell search, synchronization or channel estimation. The UpPTS is used for channel estimation in a BS and UL transmission synchronization acquisition in a UE. The GP provides a switching time between UL transmission and DL transmission. Each of the normal subframes are used to transmit UL or DL according to UL-DL configuration.

Figure 3:
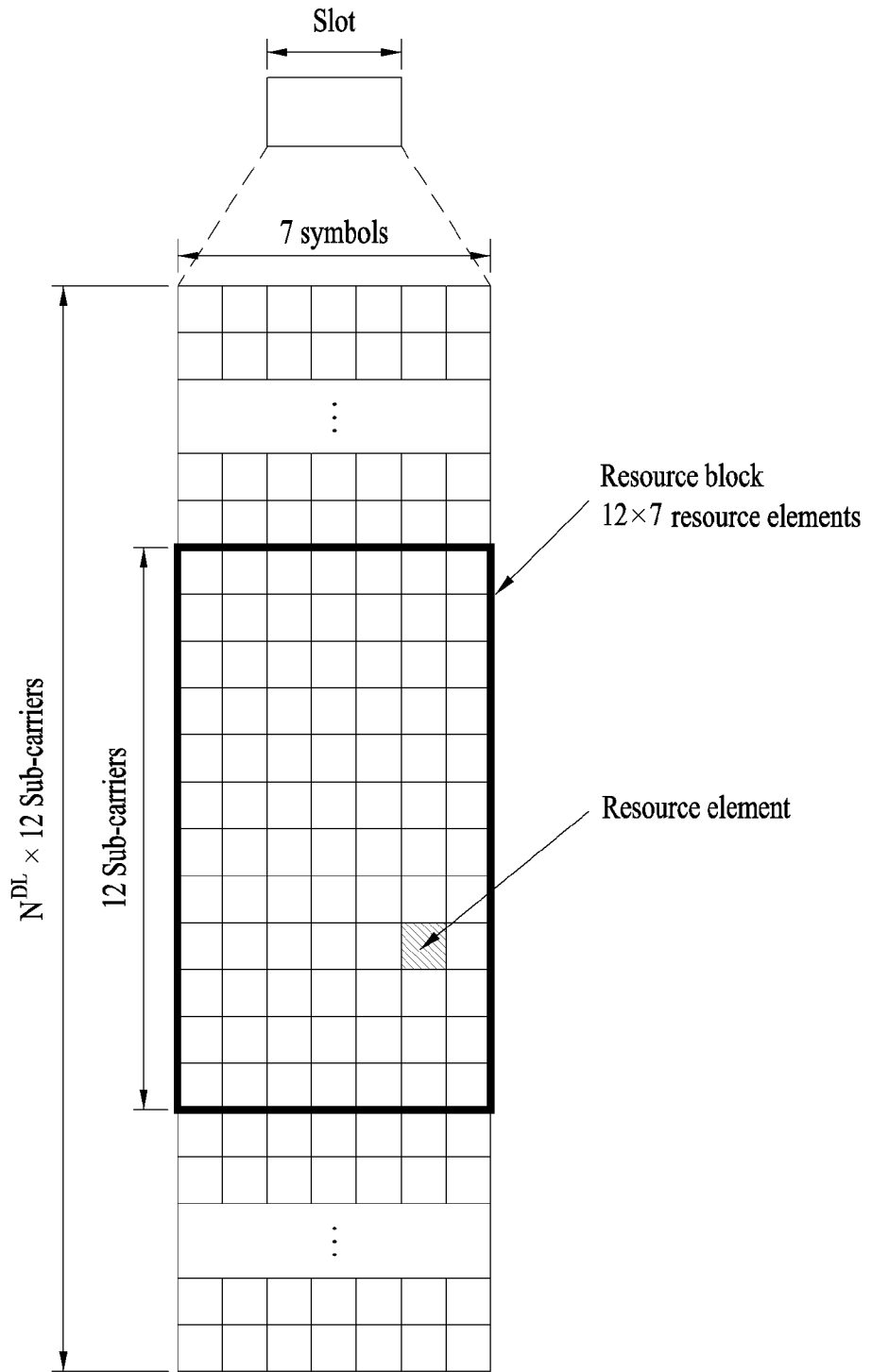
FIG. 3 illustrates a resource grid of a downlink slot.

FIG. 3 illustrates a resource grid of a downlink slot. An uplink slot structure is the same as a downlink slot structure, but OFDM symbols are substituted by SC-FDMA symbols.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be the same as that of the downlink slot, except that OFDM symbols are replaced by SC-FDMA symbols.

Figure 4:
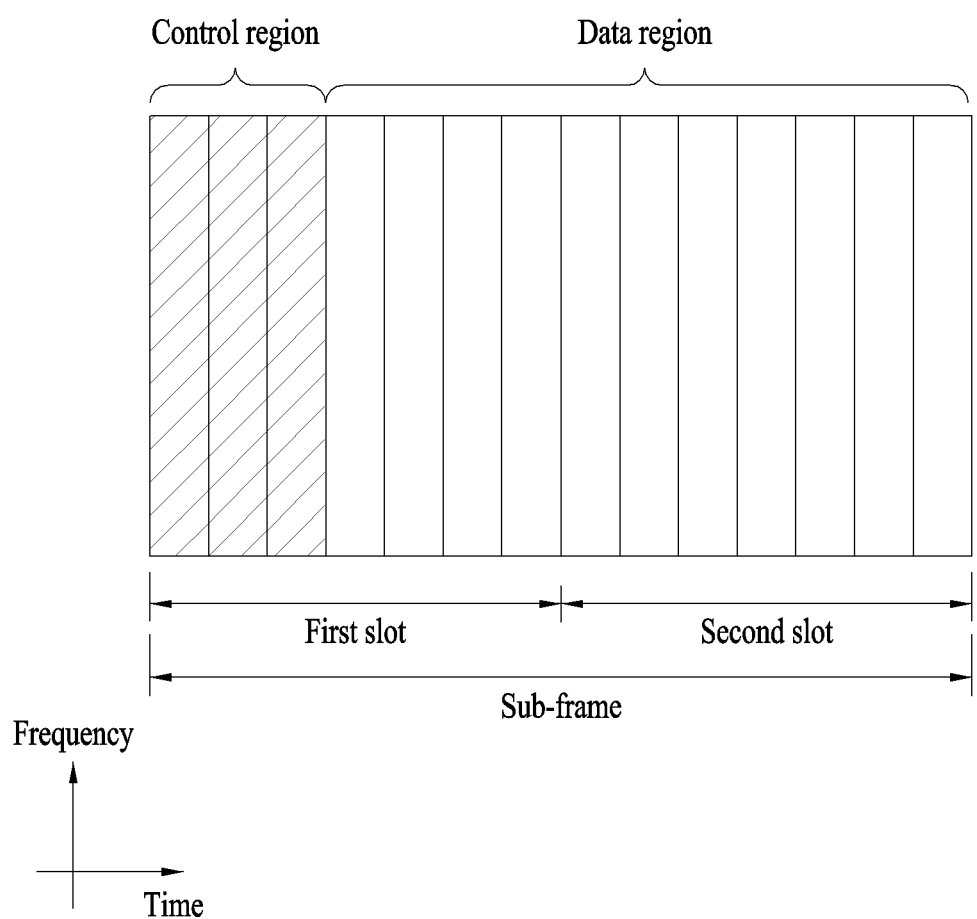
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Figure 5:
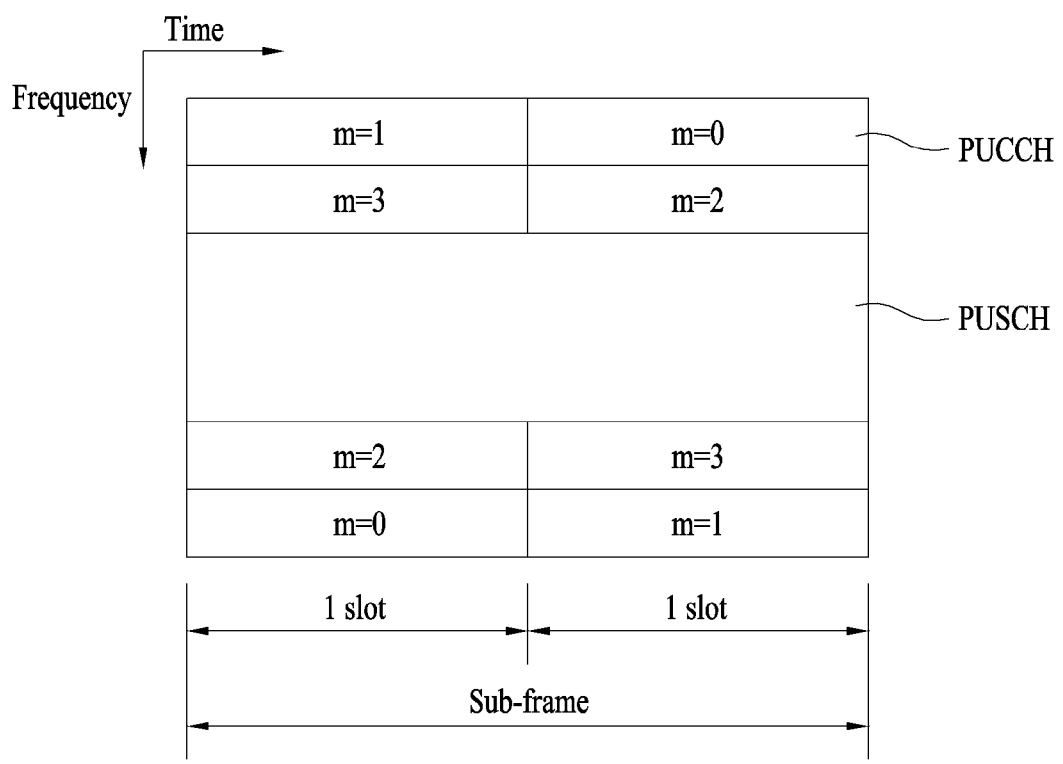
FIG. 5 illustrates an uplink subframe structure.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. FIG. 5 illustrates an uplink subframe structure.

Referring to FIG. 5, the uplink subframe includes a plurality of slots (e.g., 2 slots). The Slots can include different number of SC-FDMA symbols according to a length of CP (Cyclic Prefix). The uplink subframe is divided into a data region and a control region. The data region includes a PDSCH and is used to carry a data signal such as audio data. The control region includes a PUCCH and is used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

When an LTE UE needs to transmit UCI (e.g. CQI/PMI, HARQ-ACK, RI, etc.) in a subframe through which a PUSCH is transmitted, the LTE UE multiplexes UCI in a PUSCH region since the LTE UE cannot simultaneously transmit a PUCCH and a PUSCH. For example, when the LTE UE needs to transmit HARQ-ACK in a subframe to which PUSCH transmission is assigned, the UE multiplexes UL-SCH data and HARQ-ARQ prior to DFT-spreading and then simultaneously transmits control information and data through a PUSCH.

A description will be given of HARQ (hybrid automatic repeat request). When a plurality of UEs having data to be transmitted on uplink/downlink is present in a wireless communication system, a BS selects a UE that will transmit data per transmission time interval (TTI) (e.g. subframe). In a system using multiple carriers or similar, the BS selects a UE that will transmit data on uplink/downlink per TTI and also selects a frequency band used for the UE to transmit data.

In the case of uplink transmission, UEs transmit reference signals (or pilot signals) on uplink and the BS checks channel states of the UEs using the reference signals transmitted from the UEs and selects UEs, which will transmit data on uplink in unit frequency bands thereof, per TTI. That is, the BS transmits an uplink assignment message instructing an uplink scheduled UE to transmit data using a specific frequency band in a specific TTI. The uplink assignment message is also referred to as a UL grant. The UE transmits data on uplink in response to the uplink assignment message. The uplink assignment message may include UE ID (UE identity), RB allocation information, MCS (modulation and coding scheme), RV (redundancy version), NDI (new data indicator), etc.

In the case of synchronous non-adaptive HARQ, a retransmission time is systematically appointed (e.g. after 4 subframes from a NACK reception time). Accordingly, the BS can transmit a UL grant message to a UE only during initial transmission and retransmission following the initial transmission is performed according to an ACK/NACK signal (e.g. PHICH signal). In the case of asynchronous adaptive HARQ, a retransmission time is not appointed, and thus the BS needs to transmit a retransmission request message. Furthermore, since a frequency resource or MCS for retransmission varies according to transmission time, the retransmission request message can include a UE ID, RB allocation information, HARQ process index, RV, NDI, etc.

Figure 6:
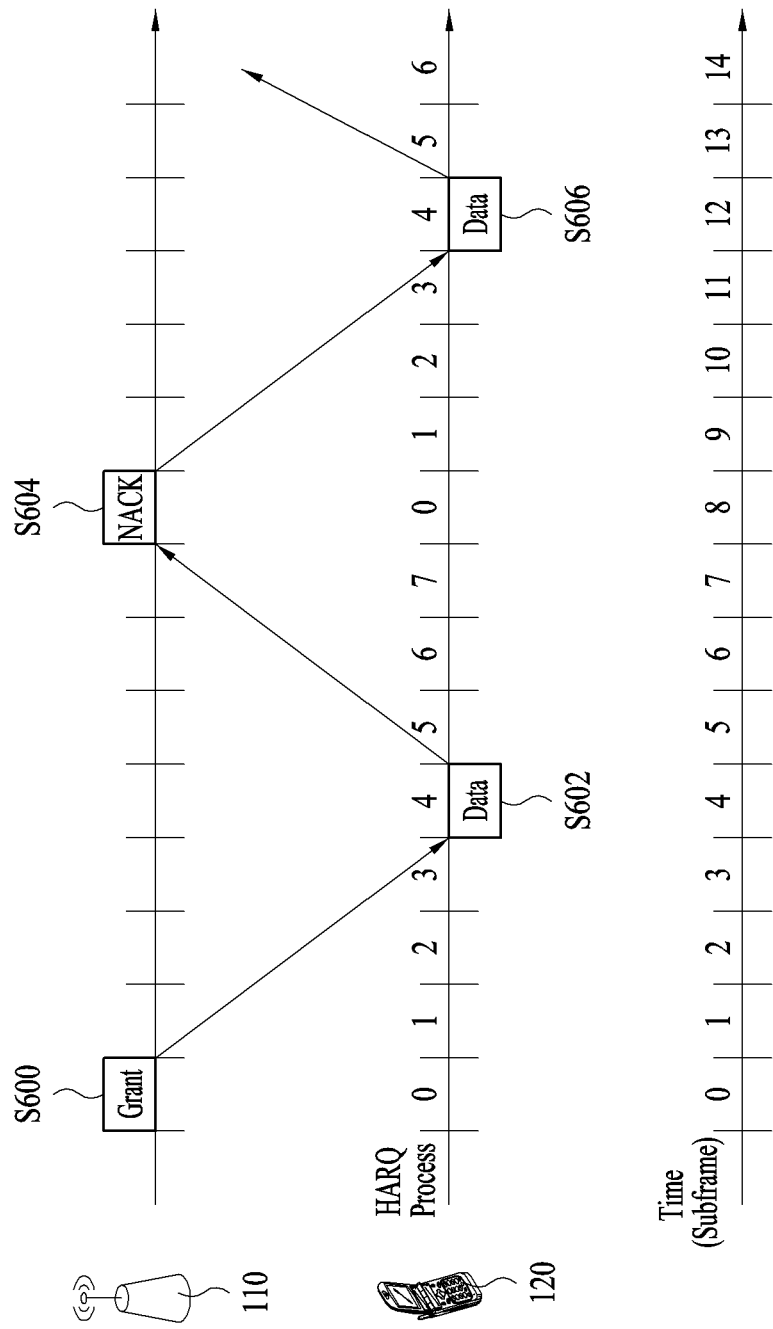
FIG. 6 illustrates a function of UL HARQ (Uplink Hybrid Automatic Repeat reQuest)

FIG. 6 illustrates UL HARQ operation in an LTE(-A) system. LTE(-A) uses synchronous non-adaptive HARQ as a UL HARQ scheme. When 8-channel HARQ is used, HARQ process numbers 0 to 7 are given. A HARQ process is performed per TTI (e.g. subframe). Referring to FIG. 6, a BS 110 transmits a UL grant to a UE 120 through a PDCCH (S600). The UE 120 transmits uplink data to the BS 110 using an RB and MCS indicated by the UL grant 4 subframes (e.g. subframe #4) from when the UL grant is received (e.g. subframe #0) (S602). The BS 110 decodes the uplink data received from the UE 120 and generates ACK/NACK. When the BS 110 has not successfully decoded the uplink data, the BS 110 transmits NACK to the UE 120 (S604). The UE 120 retransmits the uplink data 4 subframes from when NACK is received (S606). Initial transmission and retransmission of the uplink data are performed by the same HARQ process (e.g. HARQ process #4). ACK/NACK information can be transmitted on a PHICH.

Semi-persistent scheduling (SPS) will now be described. Normal unicast data dynamically allocates a resource per subframe according to scheduling. On the other hand, SPS reserves resources for traffic, which is periodically generated having a middle/low data rate, such as VoIP (voice over Internet protocol) or streaming. SPS can reduce scheduling overhead and stably allocate resources by reserving resources for specific traffic.

In the case of DL/UL SPS in LTE(-A), information (referred to as SPS configuration information hereinafter) about a subframe in which SPS transmission (Tx)/reception (Rx) needs to be performed is provided through RRC (Radio resource control) signaling and activation, reactivation and release of SPS is performed through a PDCCH. Subframe information for SPS includes a subframe interval and subframe offset. The PDCCH for SPS activation/reactivation/release is referred to as an SPS PDCCH for convenience. The SPS PDCCH carries RB allocation information for SPS Tx/Rx and MCS information. In the case of SPS PDCCH, CRC (cyclic redundancy check) is masked with an SPS C-RNTI (cell radio network temporary identifier). Accordingly, a UE does not immediately perform SPS Tx/Rx even when information about a subframe related to SPS is allocated to the UE through RRC signaling. Upon reception of an SPS PDCCH indicating SPS activation (or reactivation), the UE performs SPS Tx (e.g. transmission of PUSCH (referred to as SPS-PUSCH hereinafter)) or SPS Rx (e.g. reception of PDSCH (referred to as SPS-PDSCH hereinafter)) in the subframe allocated through RRC signaling. SPS Tx/Rx is performed in a subframe using RB allocation information and MCS information included in the SPS PDCCH. Upon reception of a PDCCH indicating SPS release, the UE stops SPS Tx/Rx. When an SPS PDCCH indicating activation (or reactivation) is received, stopped SPS Tx/Rx is resumed in a subframe allocated through RRC signaling using RB allocation information and MCS information designated by the SPS PDCCH. SPS transmission timing, RB allocation information, MCS information, etc. with respect to activated SPS can be changed according to a "reactivation" command sent over a PDCCH. In addition, resources, MCS, etc. to be used for PDSCH/PUSCH retransmission in activated SPS can be changed through a PDCCH ("reallocation").

Figure 7:
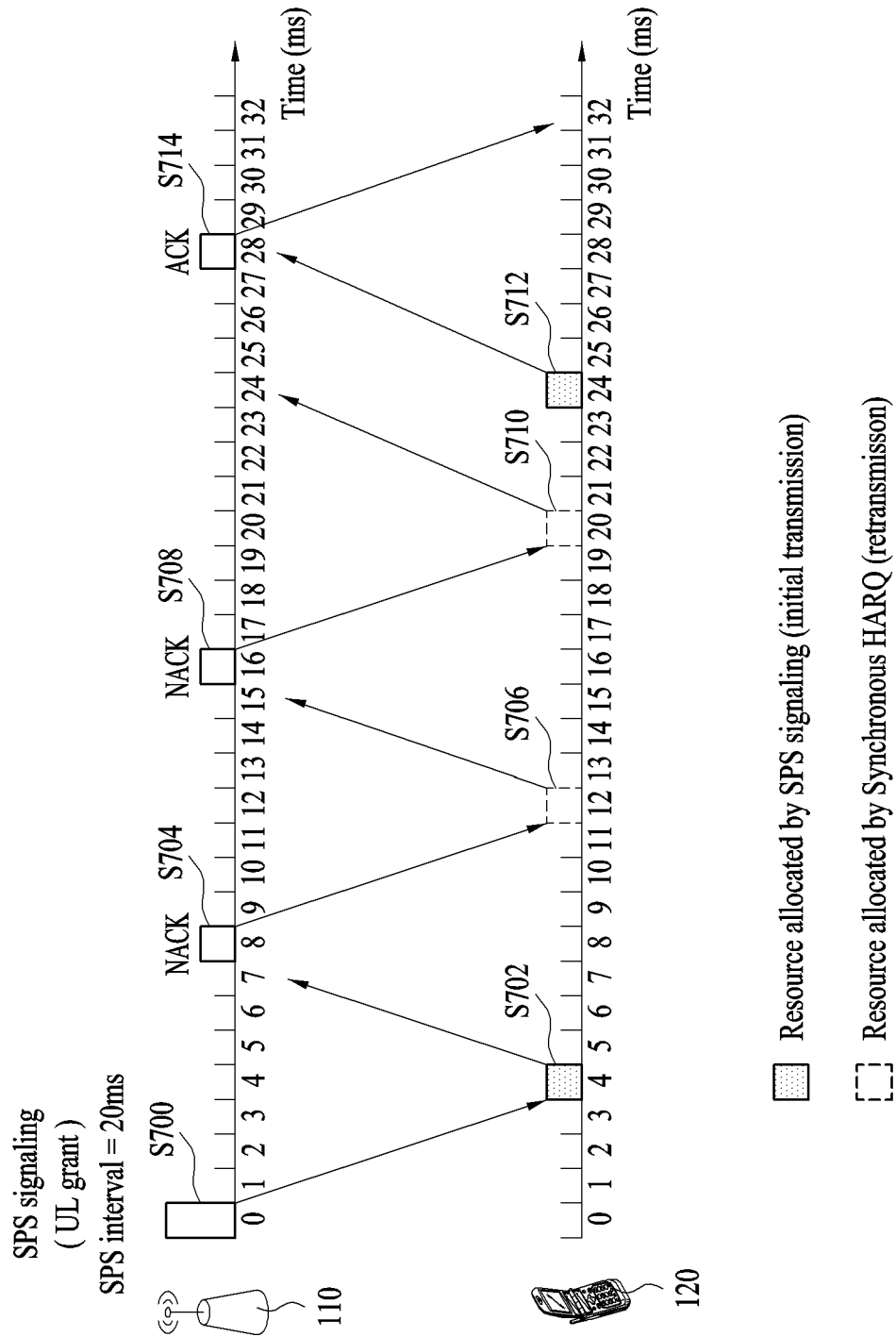
FIG. 7 illustrates an uplink SPS (Semi-Persistent Scheduling) operation.

FIG. 7 illustrates an uplink SPS operation. It is assumed that an SPS resource allocation interval is set to 20 ms through higher layer (e.g. RRC) signaling.

Referring to FIG. 7, the BS 110 transmits an SPS PDCCH indicating SPS activation to the UE 120 (S700). The SPS PDCCH includes UL grant information. In this case, the UE 120 is assigned a specific RB, MCS, etc. designated by the SPS PDCCH for uplink transmission at an interval of 20 ms from when a UL grant message is received through SPS signaling. Accordingly, the UE 120 can perform uplink transmission using the RB and MCS indicated by the SPS PDCCH at an interval of 20 ms (S702 and S712). When UL synchronous HARQ is used, resources for retransmission are reserved at an interval of 8 ms after initial transmission (S706 and S710). Specifically, the UE 120 performs retransmission through resources reserved for HARQ retransmission (S706 and S710) upon reception of NACK for uplink data (S704 and S708). When the UE 120 has successfully performed initial transmission, that is, when the UE 120 has received ACK for the uplink data (S714), the resources reserved for HARQ retransmission can be used by other UEs.

Figure 8:
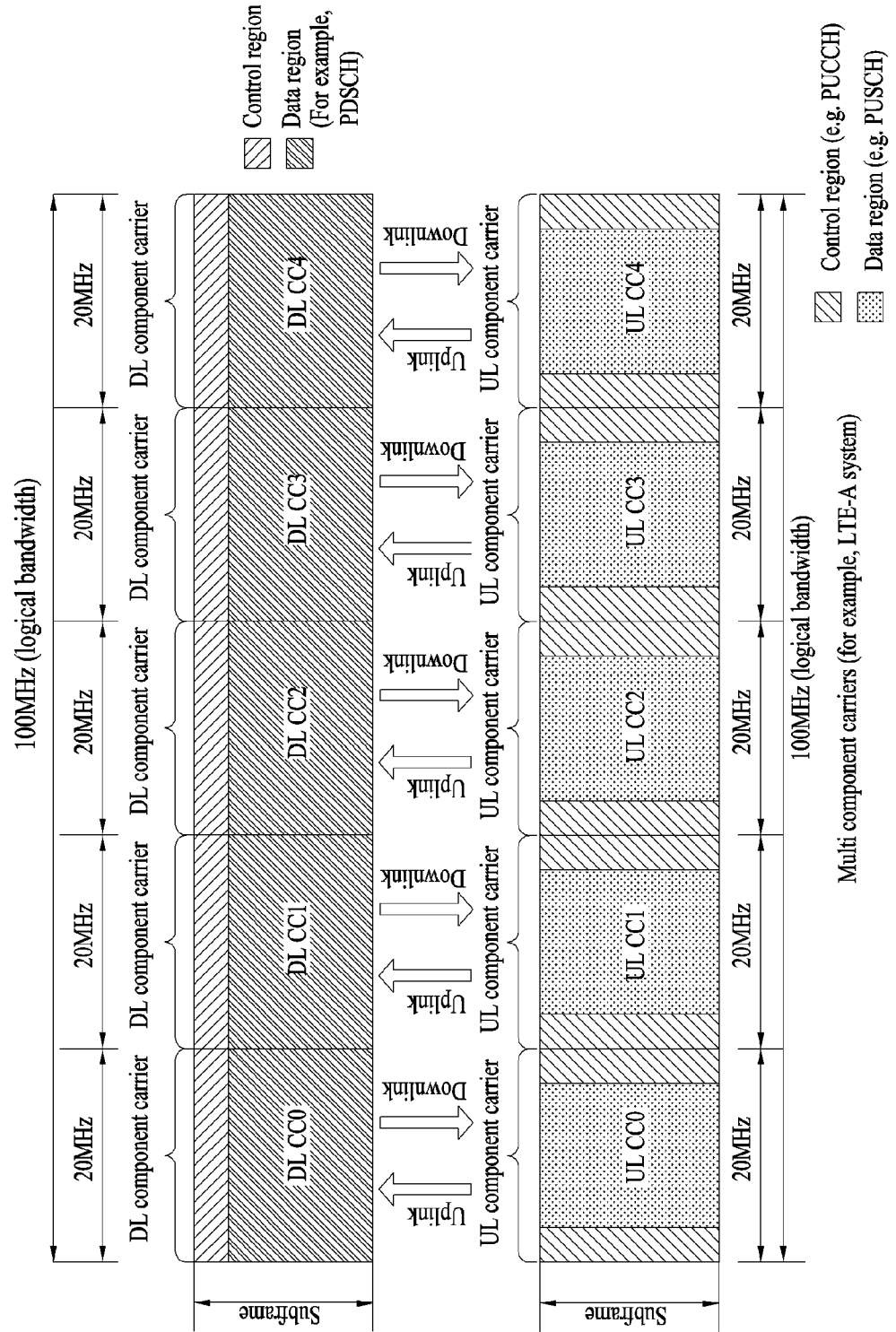
FIG. 8 illustrates a Carrier Aggregation (CA) communication system.

FIG. 8 illustrates a carrier aggregation (CA) communication system. To use a wider frequency band, an LTE-A system employs CA (or bandwidth aggregation) which aggregates a plurality of UL/DL frequency blocks to obtain a wider UL/DL bandwidth. Each frequency block is transmitted using a component carrier (CC). The CC can be regarded as a carrier frequency (or center carrier or center frequency) for the frequency block.

Referring to FIG. 8, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell, which is composed of a PCell only, exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline for PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by terms such as "monitoring carrier" and "monitoring cell". The term "CC" aggregated for the UE can be replaced by terms such as "serving CC", "serving carrier" and "serving cell".

Figure 9:
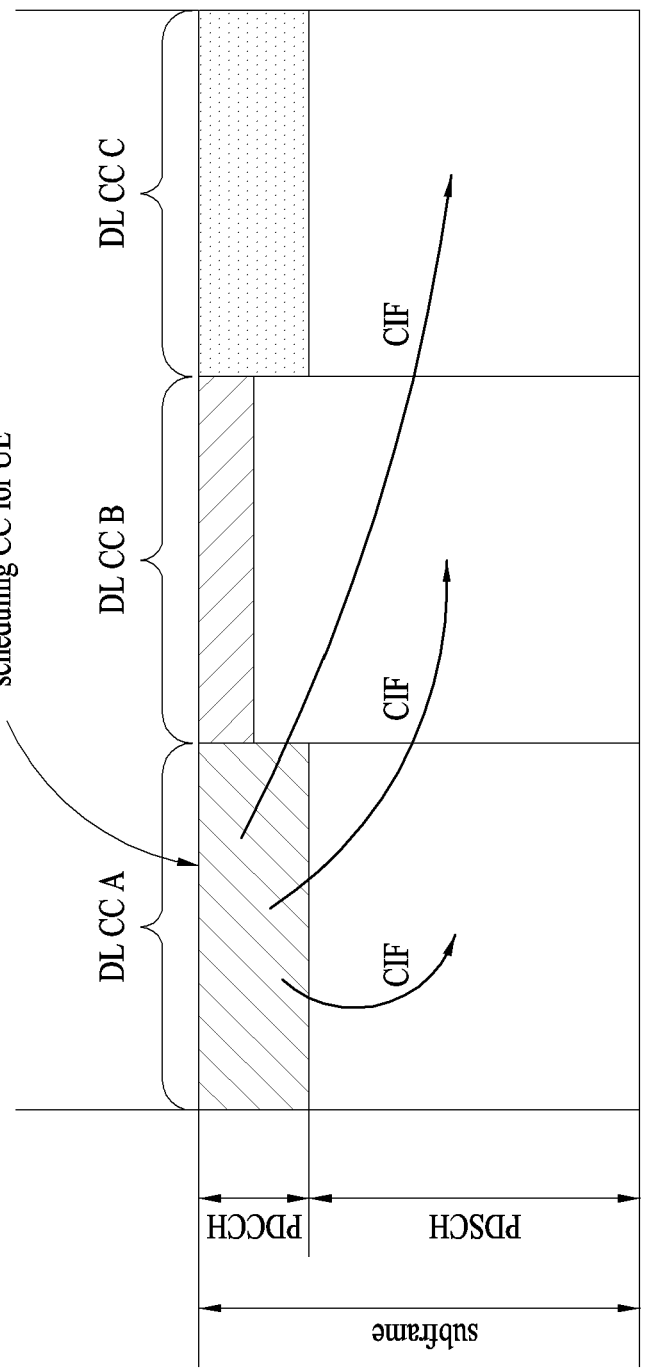
FIG. 9 illustrates a scheduling of cross carrier.

FIG. 9 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. When the CIF is disabled, a DL CC can transmit only a PDCCH that schedules a PDSCH corresponding to the DL CC without a CIF according to LTE PDCCH rules. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C which is not set as a PDCCH monitoring DL CC.

The present invention proposes scheduling and HARQ ACK/NACK feedback methods useful when plural UEs simultaneously attempt UL/DL transmission. The present invention can be usefully applied to MTC (machine type communication), which is delay tolerant and requires a relatively small amount of data. However, the present invention is not limited to MTC. MTC is interchangeably used with M2M (machine to machine) communication, D2D (device to device) communication, etc. While the following description is based on MTC, the scope of the present invention is not limited thereto.

Embodiment 1: SPS Scheduling/Feedback for MTC

When a UE does not require a high data rate or is delay tolerant, the UE can use SPS used in LTE(-A). Specifically, for MTC uplink scheduling, a load of a PDCCH that schedules a plurality of UEs can be reduced using an SPS-PDCCH (refer to FIG. 7) defined in LTE(-A). In MTC SPS, however, data can be transmitted using an SPS-PDCCH having a longer transmission period than the SPS transmission period (or resource allocation interval) of LTE(-A).

In LTE(-A), synchronous retransmission (e.g. automatic retransmission using the same resource after k subframes (e.g. k=4 in the case of FDD) in the case of NACK after reception of a PHICH) (refer to FIG. 6) is used for uplink retransmission. However, the probability that SPS-PUSCH retransmission is needed may be very low because a channel between the BS and the UE is stable/static or coding gain is high owing to a low data rate in MTC. Accordingly, MTC can consider SPS-PUSCH retransmission using an asynchronous retransmission scheme. That is, the BS can order PUSCH retransmission using a PDCCH. In this case, resources reserved for synchronous retransmission in LTE(-A) can be used to schedule other UEs. According to the present embodiment, a UE using synchronous retransmission and a UE using asynchronous retransmission coexist in the same system and thus it is necessary to set which UE uses which retransmission scheme. To achieve this, 1-bit information indicating a HARQ feedback scheme can be transmitted to a UE through SPS configuration information. Alternatively, HARQ feedback schemes for UE types can be predefined. For example, it can be predetermined that a normal UE uses conventional synchronous retransmission and an MTC UE uses asynchronous retransmission.

Figure 10:
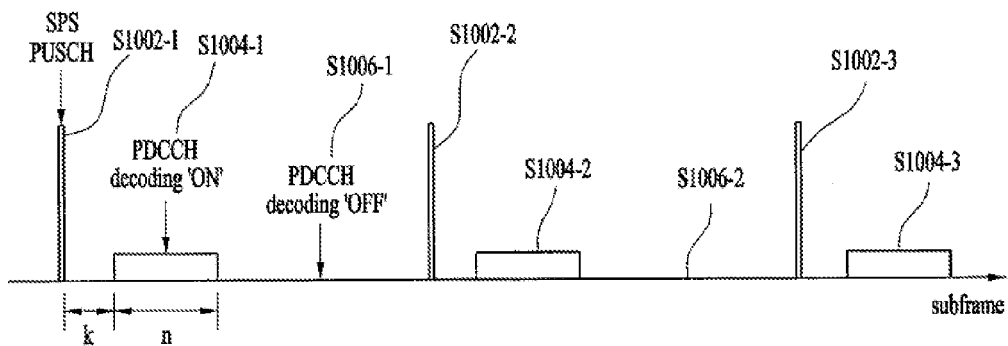
FIGS. 10 to 11 illustrates an exemplary uplink scheduling and ACK/NACK feedback procedure.

FIG. 10 illustrates an exemplary uplink scheduling and ACK/NACK feedback procedure.

Referring to FIG. 10, a UE can transmit an SPS-PUSCH (S1002-1, S1002-2 and S1002-3) and then attempt to detect a PDCCH (which can indicate retransmission) for n subframes after k subframes (S1004-1, S1004-2 and S1004-3). In the case of FDD, k can be 4. However, k is not limited thereto. Here, n is a positive integer. The PDCCH that indicates retransmission includes a HARQ index and thus the PDCCH can indicate a HARQ process necessary for retransmission. If the UE receives the PDCCH indicating retransmission, the UE can attempt retransmission using a resource (time domain and/or frequency domain), a modulation scheme, etc., indicated by the PDCCH (which is not shown). If the PDCCH is not detected, the UE does not attempt retransmission (S1006-1 and S1006-2). In the present embodiment, since the UE attempts to detect the PDCCH instead of a PHICH in order to check HARQ feedback, the BS can save PHICH resources.

Figure 11:
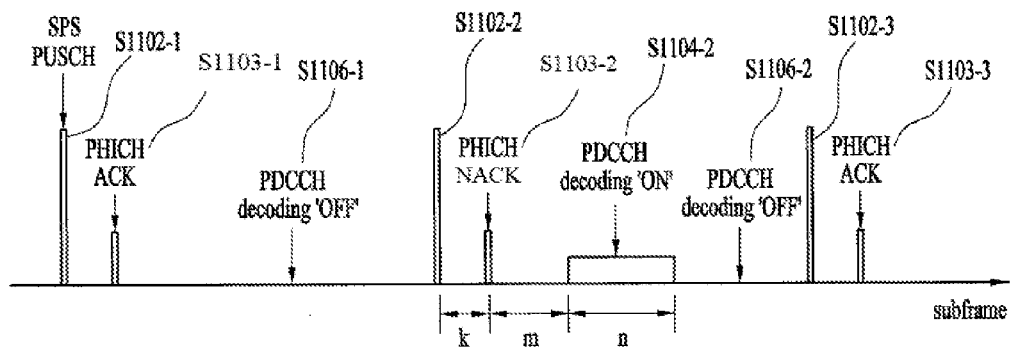

FIG. 11 illustrates another exemplary uplink scheduling and ACK/NACK feedback procedure.

Referring to FIG. 11, the UE transmits an SPS-PUSCH (S1102-1, S1102-2 and S1102-3) and then detects a PHICH after k subframes (S1103-1, S1103-2 and S1103-3). When a PHICH response is NACK (S1103-2), the UE can attempt to detect a PDCCH (that can indicate retransmission) for n subframes after m subframes. In the case of FDD, k can be 4. However, k is not limited thereto. Here, M is 0 or a positive integer and n is a positive integer. Since the PDCCH that indicates retransmission includes a HARQ index, the PDCCH can indicate a HARQ process necessary for retransmission. Upon reception of the PDCCH indicating retransmission in a PDCCH decoding 'ON' period, the UE can attempt retransmission using a resource (time domain and/or frequency domain), a modulation scheme, etc., indicated by the PDCCH (which is not shown). If the PDCCH is not detected, the UE does not attempt retransmission (S1106-2). In the present embodiment, while the UE attempts to detect the PHICH, the UE additionally attempts to detect the PDCCH only when the PHICH corresponds to NACK, and thus unnecessary power waste due to continuous PDCCH detection attempts can be reduced, compared to the procedure shown in FIG. 10.

While FIGS. 10 and 11 illustrate SPS-PUSCH transmission, the above-described PUSCH retransmission scheme is applicable to retransmission of a normal PUSCH (i.e. non-SPS PUSCH).

Embodiment 2: Group Scheduling/Feedback for MTC

The present embodiment proposes group scheduling for a UE that does not require a high data rate and is delay tolerant.

UL Scheduling

A large quantity of control information may be necessary to simultaneously trigger UL scheduling for a plurality of UEs. However, it is difficult to newly define DCI format sizes because the size of a DCI format for carrying a UL grant is fixed and PDCCH blind decoding overhead increases as the number of DCI format sizes increases. Accordingly, the present embodiment proposes a method of configuring some UL scheduling information for each UE through higher layer signaling (e.g. RRC signaling) and then simultaneously scheduling a plurality of UEs by dynamically transmitting a limited command through L1 (Layer 1)/L2 (Layer 2) signaling (e.g. PDCCH signal and MAC signaling). In this case, each UE can decode a PDCCH using an RNTI commonly used by the plurality of UEs and then combine information on a bit position (which can be previously set through a higher layer signal) which indicates UL scheduling/transmission of the UE and information predetermined by a higher layer to perform UL transmission. The information predetermined by the higher layer can include at least some of RB RA (resource block resource allocation) information, an MCS level, a transport block (TB) size, precoding information (e.g. rank information, precoding matrix information, etc.), PHICH resource allocation information, etc.

A PHICH resource is linked to the first PRB (physical resource block) index used in PUSCH transmission and PHICH allocation information includes a resource offset used in PHICH resource determination. Specifically, the PHICH resource is identified by an index pair $n_{PHICH}^{group}$ and $n_{PHICH}^{seq}$. Here $n_{PHICH}^{group}$ denotes a PHICH group number and $n_{PHICH}^{seq}$ denotes an orthogonal sequence index in a PHICH group. $n_{PHICH}^{group}$ and $n_{PHICH}^{seq}$ are configured using the lowest PRB index from among RPB indices allocated for PUSCH transmission and a cyclic shift (CS) of a DMRS transmitted through a UL grant. $n_{PHICH}^{group}$ and $n_{PHICH}^{seq}$ can be given by the following equations or modified versions thereof.

$$n_{PHICH}^{group} = (I_{PRB\_RA}^{lowest\_index} + n_{DMRS}) \mod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \mod 2 N_{SP}^{PHICH}$$

[Equation 1]

Here, $n_{DMRS}$ is mapped from a CS value for a DMRS and $N_{SF}^{PHICH}$ denotes a spreading factor size used in PHICH demodulation. $I_{PRB\_RA}^{lowest\_index}$ denotes the lowest PRB index for PUSCH transmission. $N_{PHICH}^{group}$ represents the number of PHICH groups and $I_{PHICH}$ has a value of 0 or 1 according to frame or subframe type.

In simplest form, all UL transmission related control information (RB RA, MCS, TB size, etc.) can be configured through higher layer signaling and only 1-bit trigger information (information indicating whether UL transmission is permitted or not) can be transmitted through a PDCCH. In other words, when a bit corresponding to the UE in a PDCCH DCI format indicates UL transmission, the UE can perform UL transmission (e.g. PUSCH transmission) using a UL transmission resource predetermined by a higher layer. To achieve this, DCI carried by the PDCCH can include bitmap information and each bit can be used to trigger UL transmission of the corresponding UE.

Alternatively, a method of transmitting a PUSCH using a predetermined resource and modulation scheme upon reception of a PDCCH decoded with a specific (group) RNTI can be considered. Specifically, the UE can perform UL transmission using a resource set indicated by a dynamic signal (e.g. PDCCH signal) from among a plurality of resource sets configured by a higher layer. For example, the BS can pre-assign 4 resource sets to the UE through higher layer signaling and then indicate one of the 4 resource sets using 2-bit information included in a PDCCH signal to the UE. In this case, the UE can perform UL transmission using resources corresponding to the resource set indicated by the PDCCH. The resource set may have a combination of {TB size and/or MCS and/or RA and/or PHICH resource}. However, the resource set is not limited thereto.

Figure 12:
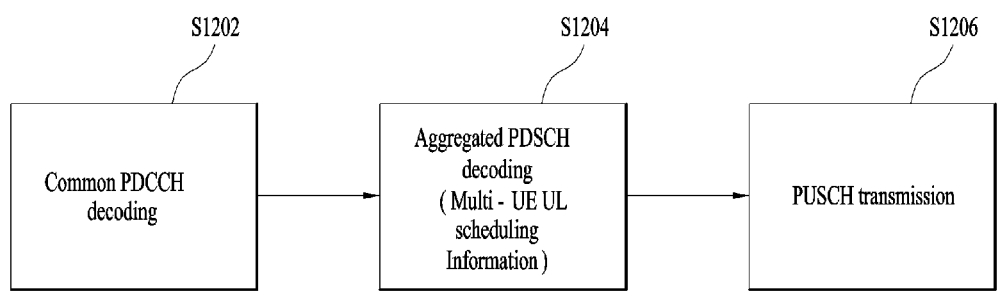
FIG. 12 illustrates another exemplary uplink scheduling procedure.

FIG. 12 illustrates another exemplary uplink scheduling procedure. This uplink scheduling procedure corresponds to a 2-stage uplink scheduling message delivery method.

Referring to FIG. 12, the UE can detect a PDCCH (scrambled with a common RNTI) that can be simultaneously decoded by a plurality of UEs (S1202) and receive an aggregated PDSCH indicated by the PDCCH (S1204). Here, the aggregated PDSCH refers to a PDSCH including UL scheduling information of the plurality of UEs. Accordingly, the UE can extract UL scheduling information corresponding thereto from the aggregated PDSCH and then perform UL transmission corresponding thereto. In this case, the UE performs PUSCH transmission using a UL transmission resource indicated by the aggregated PDSCH. (i.e., dedicated PUSCH for the UE) (S1206). The dedicated PUSCH for the UE can be configured such that the same is transmitted after k subframes from reception of the aggregated PDSCH. Here, k is a positive integer. In the case of FDD, k can be 4.

In the case of an MTC UE, a method of indicating a time resource (e.g. k) can be considered for effective resource utilization since the MTC UE is delay tolerant. For this, a method of indicating a subframe index (or subframe offset) corresponding to a subframe in which a PUSCH will be transmitted in a fixed (limited) resource can be considered. Here, the subframe index can refer to a subframe index in the corresponding radio frame. The subframe offset can refer to an interval between a subframe in which a UL grant command is received and a subframe in which a PUSCH is transmitted. In one embodiment, UL scheduling information of the aggregated PDSCH can include information indicating a time resource (e.g. subframe index or subframe offset) as well as a frequency resource (e.g. RB RA). In another embodiment, a time resource (e.g. subframe offset value) for PUSCH transmission can be configured for a group-triggered UE through a higher layer signal and thus, only a frequency resource need be indicated through the aggregated PDSCH.

The aggregated PDSCH can include PHICH resource allocation information. In addition, as proposed in embodiment 1, some UL triggering control information (e.g. RA, MCS, etc.) can be previously set by a higher layer and only limited control information can be transmitted through the aggregated PDSCH. For example, the BS can configure a plurality of resource sets having a combination of {TB size and/or MCS and/or RA} for the UE and then signal one of the plurality of resource sets to the UE using a dynamic signal (e.g. aggregated PDSCH). In this case, the UE can perform UL transmission (e.g. PUSCH transmission) using the signaled resource set. For example, the BS can pre-configure 4 resource sets through a higher layer and signal one of the 4 resource sets to the UE using 2-bit information such that the UE performs UL transmission.

DL Scheduling

The following two methods can be considered as a method for simultaneously DL-scheduling a plurality of UEs while reducing the quantity of DL control information. The DL scheduling method is similar to UL scheduling.

It is possible to consider a method of configuring some DL scheduling information, e.g., RB RA information, an MCS level, a TB size, an ACK/NACK PUCCH resource, etc. for each UE through a higher layer signal and then simultaneously scheduling a plurality of UEs by dynamically transmitting a limited command through L1/L2. In this case, each UE can decode a PDCCH using an RNTI commonly used by the plurality of UEs and then combine information on a bit position (which can be previously set through a higher layer signal) which indicates DL scheduling/transmission of the UE and information predetermined by a higher layer to receive DL data (e.g. a PDSCH signal). The information predetermined by the higher layer can include at least some of RB RA information, an MCS level, a TB size, precoding information (e.g. rank information, precoding matrix information, etc.), ACK/NACK PUCCH resource allocation information, etc.

An ACK/NACK PUCCH resource is linked to the first CCE (control channel element) index used for PDCCH transmission and the ACK/NACK PUCCH resource allocation information includes a resource offset used in ACK/NACK PUCCH resource determination. Specifically, a PHICH resource for ACK/NACK can be given by the following equation or a modified version thereof.

$$n^{(1)}_{PUCCH} = n_{CCE} + N^{(1)}_{PUCCH}$$ [Equation 2]

Here, $n^{(1)}_{PUCCH}$ denotes a PUCCH resource index for ACK/NACK transmission, $N_{PUCCH}^{(1)}$ denotes a signaling value transmitted from a higher layer and $n_{CCE}$ represents the lowest CCE index used for PDCCH transmission.

In simplest form, all DL transmission related control information (RB RA, MCS, TB size, etc.) can be configured through a higher layer signals and only 1-bit trigger information (information indicating whether DL transmission is performed or not) can be transmitted through a PDCCH. In other words, when a bit corresponding to the UE in a PDCCH DCI format indicates DL transmission, the UE can receive DL data (e.g. a PDSCH signal) using a DL transmission resource predetermined by a higher layer. To achieve this, DCI carried by the PDCCH can include bitmap information and each bit can be used to indicate DL transmission to the corresponding UE.

Alternatively, a method of receiving a PUSCH using a predetermined resource and modulation scheme upon reception of a PDCCH decoded with a specific (group) RNTI can be considered. Specifically, the UE can receive a PDSCH using a resource set indicated by a dynamic signal (e.g. PDCCH signal) from among a plurality of resource sets configured by a higher layer. For example, the BS can pre-assign 4 resource sets to the UE through higher layer signaling and then indicate one of the 4 resource sets to the UE using 2-bit information included in a PDCCH signal. In this case, the UE can receive a PDSCH using resources corresponding to the resource set indicated by the PDCCH. The resource set may have a combination of {TB size and/or MCS and/or RA and/or ACK/NACK resource}. However, the resource set is not limited thereto.

Figure 13:
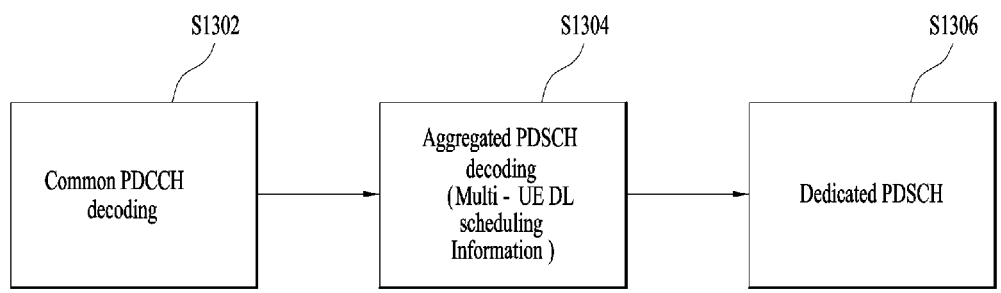
FIG. 13 illustrates another exemplary downlink scheduling procedure.

FIG. 13 illustrates another exemplary downlink scheduling procedure. This downlink scheduling procedure corresponds to a 2-stage downlink triggering message delivery method.

Referring to FIG. 13, the UE can detect a PDCCH (scrambled with a common RNTI) that can be simultaneously decoded by a plurality of UEs (S1302) and receive an aggregated PDSCH indicated by the PDCCH (S1304). Here, the aggregated PDSCH refers to a PDSCH including DL scheduling information of the plurality of UEs. Accordingly, the UE can extract DL scheduling information corresponding thereto from the aggregated PDSCH and then receive a dedicated PDSCH assigned thereto (S1306). Here, the dedicated PDSCH for the UE can be configured such that the same is received after k subframes from reception of the aggregated PDSCH. Here, k is a positive integer and can be 1, for example.

In the case of an MTC UE, it is possible to consider a method of indicating a time resource (e.g. k) for dedicated PDSCH reception for effective resource utilization since the MTC UE is delay tolerant. For this, a method of indicating a subframe index (or subframe offset) corresponding to a subframe in which a dedicated PDSCH will be transmitted can be considered. The subframe index can refer to a subframe index in the corresponding radio frame. The subframe offset can refer to an interval between a subframe in which an aggregated PDSCH (or PDCCH) is received and a subframe in which a dedicated PDSCH is received. In one embodiment, DL scheduling information of the aggregated PDSCH can include information indicating a time resource (e.g. subframe index or subframe offset) as well as a frequency resource (e.g. RB RA). In another embodiment, a time resource (e.g. subframe offset value) for PDSCH reception can be configured for a group-triggered UE through a higher layer signal and only a frequency resource can be indicated through the aggregated PDSCH.

The aggregated PDSCH can include ACK/NACK resource allocation information. In addition, as proposed above, some DL triggering control information (e.g. RA, MCS, etc.) can be previously set by a higher layer and only limited control information can be transmitted through the aggregated PDSCH. For example, the BS can configure a plurality of resource sets having a combination of {TB size and/or MCS and/or RA} for the UE and then signal one of the plurality of resource sets to the UE using a dynamic signal (e.g. aggregated PDSCH). In this case, the UE can receive a dedicated PDSCH using the signaled resource set. For example, the BS can pre-configure 4 resource sets through a higher layer and signal one of the 4 resource sets to the UE using 2-bit information such that the UE performs UL transmission.

UL ACK/NACK

A HARQ ACK/NACK feedback method when DL data is scheduled for the UE through a common PDCCH as described above (similar to the above description) is proposed. First of all, a method of pre-configuring an ACK/NACK resource for the UE can be considered. For example, which resource (a frequency domain (e.g. PRB), a code domain (e.g. cyclic shift, orthogonal sequence), a time domain (e.g. subframe)) will be used upon reception of a scheduling message can be predetermined to avoid collision of ACK/NACK PUCCH resources corresponding to DL data even if plural UEs simultaneously receive the DL data. Alternatively, the BS can transmit a signal (e.g. ARI (ACK/NACK resource indicator)) that can infer an ACK/NACK PUCCH resource (frequency domain, code domain, time domain) along with a scheduling signal. ACK/NACK PUCCH resource collision can be avoided using the ARI even when plural UEs are simultaneously scheduled.

DL ACK/NACK

A method through which the UE receives HARQ ACK/NACK when UL transmission is performed through a common PDCCH as described above (similar to the above description) is proposed. First of all, a method of commonly allocating (configuring) the same PHICH resource to all group-triggered UEs can be considered to conserve PHICH resource. In this case, the BS can deliver PHICH responses bundled in a single PHICH resource by performing ACK/NACK bundling (transmission of ACK only when all PUSCHs have been successfully received and transmission of NACK in other cases) on PUSCHs received from a plurality of UEs. Alternatively, a method of signaling a PHICH response through a common PDCCH can be considered. That is, ACK/NACK responses to plural PUSCHs can be transmitted through a single PDCCH. To achieve this, DCI carried on the PDCCH can include bitmap information and each bit can indicate a (bundled) ACK/NACK response for the corresponding UE.

Embodiment 3: Multi-UE Scheduling (Method A)

The present embodiment proposes a method of applying a PDCCH command detected through an RNTI (i.e. common RNTI) necessary to detect a DL/UL grant PDCCH to a plurality of UEs on the assumption that plural UEs or UEs in a group share the RNTI.

Figure 14:
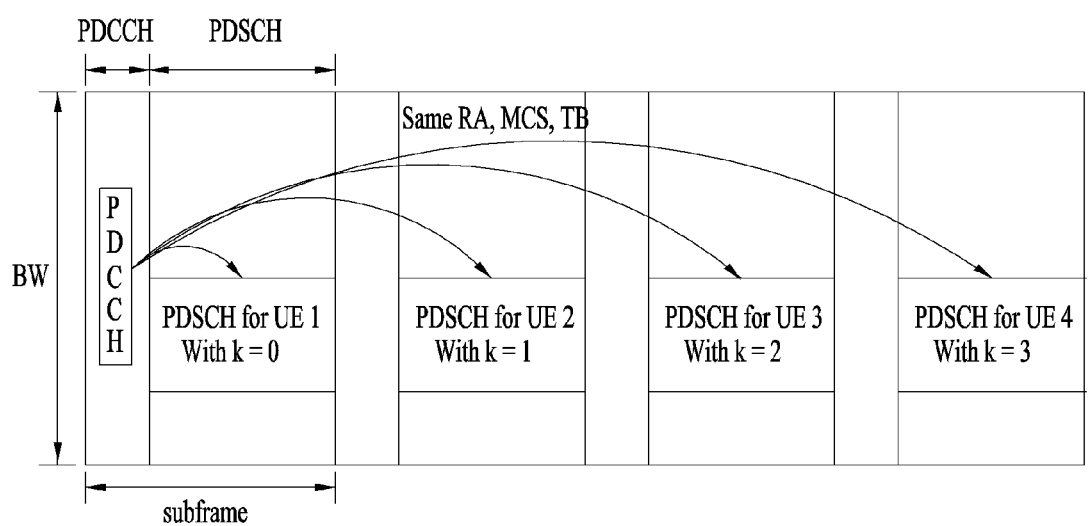
FIG. 14 illustrates a method for scheduling a plurality of UEs according to the present embodiment.

FIG. 14 illustrates a method for scheduling a plurality of UEs according to the present embodiment. Referring to FIG. 14, a command (PDCCH signal) can be commonly applied to 4 UEs, UE1, UE2, UE3 and UE4. The 4 UEs refer to a group sharing the same RNTI. However, while DL scheduling information (e.g. RB RA, MCS, TB size, etc.) included in a PDCCH is commonly applied to the 4 UEs, PDSCH decoding times k of the UEs may be different. That is, different PDSCHs can be transmitted to the respective UEs through a single control command (PDCCH). To achieve this, an offset (k) between a PDCCH reception time and a PDSCH reception time can be pre-configured through a higher layer for each UE. In this case, different PDSCHs can be transmitted to different UEs through a single PDCCH command when offset values are preset through a higher layer signal, such as k=0 for UE1 and k=2 for UE2 in FIG. 14. The offset k for each UE can be included in DL scheduling information about the corresponding UE in the PDCCH.

According to the present embodiment, it is possible to reduce control signaling overhead when a plurality of UEs transmits/receives data using similar/identical data throughput or payload and/or the UEs are delay tolerant.

While FIG. 14 illustrates DL scheduling, the method shown in FIG. 14 is applicable to UL scheduling. Specifically, PUSCHs of a plurality UEs can be triggered using the same PDCCH command by presetting different offset values (h) between a PDCCH reception time and a PUSCH transmission time.

When HARQ ACK/NACK signals for PDSCHs scheduled through the common PDCCH of FIG. 14 are transmitted, the UEs can commonly use a dynamic ACK/NACK resource inferred through a CCE resource of the PDCCH. Specifically, the dynamic ACK/NACK resource refers to a PUCCH resource linked to the first (or lowest) CCE index used for PDCCH transmission. That is, since the PDSCHs are received at different times through the common PDCCH and thus ACK/NACK signals therefor are transmitted at different times, ACK/NACK PUCCH resource collision can be avoided even if the UEs share a resource (i.e. a PUCCH resource inferred through the first CCE) inferred through the single PDCCH. Similarly, in the case of PHICH resources for PUSCHs inferred through the common PDCCH, the same PHICH resource can be shared by different UEs since PUSCHs are transmitted at different times even if the PUSCHs have the same PRB index.

A method of allocating a resource configured through a higher layer signal to UEs scheduled by the same PDCCH and commonly using the resource for the UEs (e.g. TDM) can be considered as a resource allocation scheme for transmitting ACK/NACK for a PDSCH. In this case, a dynamic ACK/NACK PUCCH resource inferred from a CCE used for PDCCH transmission can be used for other UEs which are not group-scheduled. For this operation, a method of pre-allocating an ACK/NACK PUCCH resource to a UE to which a subframe offset k between PDCCH decoding and PDSCH decoding is signaled, through a higher layer signal, can be considered. In addition, a method of allocating an ACK/ANCK PUCCH resource only to a UE which does not correspond to k=0 through RRC can be considered.

Embodiment 4: Multi-UE Scheduling (Method B)

In embodiment 3 (method A), UL/DL grants are assigned to a plurality of UEs using a single PDCCH based on a common RNTI and a plurality of DL/UL transmissions corresponding thereto are performed using TDM.

The present embodiment is identical to embodiment 3 (method A) in that UL/DL grants are allocated to a plurality of UEs using a single PDCCH based on a common RNTI. However, according to the present embodiment, individual pieces of data of the plural UEs can be jointly or separately coded (and/or frequency-division-multiplexed/code-division-multiplexed/time-division-multiplexed) in a PDSCH of a specific subframe scheduled by a DL grant and simultaneously transmitted in the case of DL scheduling. In this case, individual data of each UE or coded bits/symbols thereof can be scrambled based on an ID of the UE, which is provided separately from the common RNTI. In the case of UL scheduling, a method of dividing a UL resource region of a specific subframe assigned by a UL grant according to FDM/CDM/TDM such that the UEs individually perform PUSCHs through the divided UL resource regions can be considered.

TDM according to the present embodiment (method B) is performed on a slot or symbol basis within a subframe, distinguished from subframe based TDM of embodiment 3 (method A). Information on a data reception position (e.g. bit position and/or frequency/code/time resource) of each UE in a PDSCH, information on a PUSCH transmission position (e.g. frequency/code/time resource) of each UE in a UL resource allocated through a UL grant and/or information on a DMRS CS (cyclic shift) offset (i.e. a DMRS CS offset value per UE applied based on a DMRS CS field value signaled through a UL grant (or an actual DMRS CS value calculated from the DMRS CS field value)) can be semi-statically designated through RRC signaling (i.e. per-UE-conf). In this case, the data reception position of each UE, the data PUSCH transmission position of each UE and the DMRS CS offset information can be confirmed or given using the ID of each UE.

That is, the present embodiment (method B) dynamically allocates common resource information (PDSCH or PUSCH region), MCS and TB size information, etc. to a plurality of UEs using a single PDCCH (DL or UL grant) and semi-statically designates data reception or transmission position related information of each UE in an allocated resource region through RRC signaling.

According to the present embodiment (method B), in the case of ACK/NACK for DL scheduling, an ACK/NACK transmission resource (e.g. ACK/NACK PUCCH resource) can be reserved per UE through RRC signaling. Otherwise, ACK/NACK resource information can be directly signaled to each UE through a PDSCH. Alternatively, a plurality of UEs can use an ACK/NACK PUCCH resource linked to a CCE of a DL grant PDCCH (e.g. the first CCE index $n_{CCE}$ of the PDCCH) according to TDM as in embodiment 3 (method A). Assuming PDSCH scheduling for M UEs, it is possible to consider a method through which the M UEs use M ACK/

NACK resources (e.g. ACK/NACK PUCCH resources linked to $n_{CCE}+1, \ldots, n_{CCE}+M-1$, of the DL grant PDCCH) that can be implicitly inferred from CCEs of the DL grant PDCCH for ACK/NACK transmission. In this case, which one of the M ACK/NACK resources is allocated to which one of the M UEs can be pre-signaled.

In the case of ACK/NACK for UL scheduling, if a plurality of UEs performs PUSCH transmission in divided RBs in a UL resource allocated through a UL grant using a PHICH resource linked to a common DMRS CS value signaled through the UL grant and an allocated UL RB index (e.g. the first PRB used for PUSCH transmission), PUSCH transmission may be successfully performed. However, considering a situation in which PUSCH resources with respect to a plurality of UEs are allocated to a single RB, since the same DMRS CS value and allocated UL RB index are assigned to the plurality of UEs and thus the same PHICH resource linked to the DMRS CS value and allocated UL RB index is allocated to the plurality of UEs, collision may occur. To solve this, bundled ACK/NACK information regarding PUSCHs from the plurality of UEs allocated to a PRB can be transmitted through a PHICH resource linked to a signaled DMRS CS value and the corresponding PRB index. Otherwise, a DMRS CS can be allocated per UE through per-UE-conf and individual ACK/NACK regarding the corresponding PUSCH can be transmitted to each UE using an individual PHICH resource linked to the DMRS CS assigned per UE. Alternatively, a PHICH offset (i.e. a PHICH index offset value per UE, applied to PHICH resource determination) can be semi-statically assigned and individual ACK/NACK can be transmitted to each UE using a PHICH resource determined based on the PHICH offset.

Figure 15:
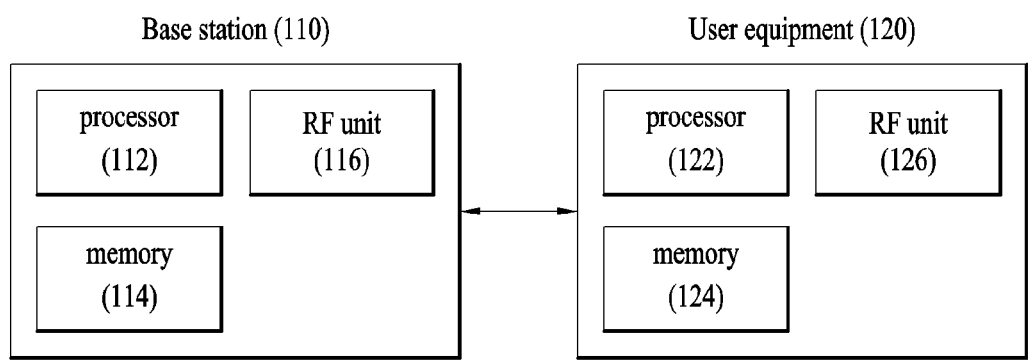
FIG. 15 illustrates a base station and a UE to which the present invention is applicable.

FIG. 15 illustrates a Base Station (BS) and a UE (User Equipment) applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 15, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'eNB', 'fixed station', 'Node B', 'Base Station', 'access point', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication such as a UE, a relay, a BS, etc.

The invention claimed is:

1. A method for performing HARQ (hybrid automatic repeat request) retransmission by a communication device in a wireless communication system, the method comprising:
   initially transmitting a data block to a Base Station (BS);
   attempting a detection of PDCCH (physical downlink control channel) in a predetermined time interval including a plurality of subframes after transmission of an uplink channel signal; and
   retransmitting the data block using a resource indicated by the PDCCH,
   wherein a retransmission is indicated by a physical hybrid ARQ indicator channel (PHICH) when the user equipment (UE) is a first type UE, and
   wherein, when the UE is a second type UE, the retransmission is indicated by a HARQ index included in the PDDCH and a reception of a PHICH corresponding to the retransmission is skipped.

2. The method according to claim 1, wherein the initial transmission of the data block is performed through a PUSCH (physical uplink shared channel) allocated to SPS (semi-persistent scheduling).

3. The method according to claim 2, wherein the predetermined time interval is periodically given according to an SPS transmission period, and PDCCH detection is skipped in subframes other than the predetermined time interval.

4. The method according to claim 1, wherein the second type UE is an MTC (machine type communication) UE.

5. A communication device configured to perform HARQ (hybrid automatic repeat request) retransmission in a wireless communication system, the communication device comprising:
 a radio frequency (RF) unit; and
 a processor,
 wherein the processor is configured to:
  initially transmit a data block to a Base Station (BS),
  attempt a detection of PDCCH (physical downlink control channel) in a predetermined time interval including a plurality of subframes after transmission of an uplink channel signal, and
  retransmit the data block using a resource indicated by the PDCCH,
 wherein a retransmission is indicated by a physical hybrid ARQ indicator channel (PHICH) when the user equipment (UE) is a first type UE, and
 wherein, when the UE is a second type UE, the retransmission is indicated by a HARQ index included in the PDDCH and a reception of a PHICH corresponding to the retransmission is skipped.

6. The communication device according to claim 5, wherein initial transmission of the data block is performed through a PUSCH (physical uplink shared channel) allocated to SPS (semi-persistent scheduling).

7. The communication device according to claim 6, wherein the predetermined time interval is periodically assigned according to an SPS transmission period, and PDCCH detection is skipped in subframes other than subframes corresponding to the predetermined time interval.

8. The communication device according to claim 5, wherein the second type UE is an MTC (machine type communication) UE.

* * * * *